United States Patent
Wang et al.

(10) Patent No.: US 12,117,571 B2
(45) Date of Patent: Oct. 15, 2024

(54) METAL-ORGANIC HYBRID LATTICE MATERIAL AND USE THEREOF IN DETECTION OF RADIATION SOURCES

(71) Applicant: SHANGHAI INSTITUTE OF APPLIED PHYSICS CHINESE ACADEMY OF SCIENCES, Shanghai (CN)

(72) Inventors: Jianqiang Wang, Shanghai (CN); Huangjie Lu, Shanghai (CN); Jian Lin, Shanghai (CN)

(73) Assignee: SHANGHAI INSTITUTE OF APPLIED PHYSICS CHINESE ACADEMY OF SCIENCES, Shanghai (CN)

( * ) Notice: Subject to any disclaimer, the term of this patent is extended or adjusted under 35 U.S.C. 154(b) by 666 days.

(21) Appl. No.: 17/429,344

(22) PCT Filed: Jun. 8, 2020

(86) PCT No.: PCT/CN2020/094813
§ 371 (c)(1),
(2) Date: Aug. 8, 2021

(87) PCT Pub. No.: WO2021/243728
PCT Pub. Date: Dec. 9, 2021

(65) Prior Publication Data
US 2022/0308241 A1    Sep. 29, 2022

(30) Foreign Application Priority Data
Jun. 4, 2020 (CN) .......................... 202010501386.X (51) Int. Cl.
*G01T 1/10* (2006.01)
*G01T 1/20* (2006.01)

(52) U.S. Cl.
CPC .............. *G01T 1/10* (2013.01); *G01T 1/2012* (2013.01)

(58) Field of Classification Search
None
See application file for complete search history.

(56) References Cited

U.S. PATENT DOCUMENTS

| 4,385,236 A | 5/1983 | Hassib et al. |
| 2015/0303390 A1 | 10/2015 | Van Der Boom et al. |

FOREIGN PATENT DOCUMENTS

| CN | 88103386 A | 12/1988 |
| CN | 101646748 A | 2/2010 |
| CN | 103980879 A | 8/2014 |
| CN | 108624316 A | 10/2018 |
| CN | 109206826 A | * 1/2019 |

OTHER PUBLICATIONS

Yuan et al. Effect of pH/metal ion on the structure of metal-organic frameworks based on novel bifunctionalized igand 49-carboxy-4,29:69,499-terpyridine. CrystEngComm, 15, 1460 (Year: 2013).*

Fan et al., Synthesis, crystal structures and properties of two Cu(II) complexes based on 4'-carboxy-2,2':6',2"-terpyridine, Chinese Journal of Inorganic Chemistry, vol. 32, No. 5, pp. 864-870 (May 31, 2016).

* cited by examiner

*Primary Examiner* — Tanisha Diggs
(74) *Attorney, Agent, or Firm* — SZDC Law PC (57) ABSTRACT

The present invention relates to a metal-organic hybrid lattice material and the application in the detection of radiation sources. In the invention, a water-soluble thorium salt and 2,2':6',2'-terpyridine-4'-carboxylic acid are subjected to a solvothermal reaction in water and an organic mixed solvent to obtain a metal-organic hybrid lattice material. The crystalline material produces radiation-induced discoloration and photoluminescence change under ultraviolet light, X-ray, γ-ray, β-ray, and so on. The material is useful for qualitative and quantitative detection and calibration after high-dose irradiation. Compared with the traditional radiation-induced color change indicator labels, the material achieves the visual qualitative and quantitative detection and has strong radiation stability, high reuse rate, wide detection range, and good linear relationship, to solve the problem of traditional materials relying on professional optical equipment to quantify the radiation dose.

2 Claims, 12 Drawing Sheets

METAL-ORGANIC HYBRID LATTICE MATERIAL AND USE THEREOF IN DETECTION OF RADIATION SOURCES

This application is the National Stage Application of PCT/CN2020/094813, filed on Jun. 8, 2020, which claims priority to Chinese Patent Application No. 202010501386.X, filed on Jun. 4, 2020, which is incorporated by reference for all purposes as if fully set forth herein.

FIELD OF THE INVENTION

The present invention relates to the field of radiation detection materials, and more particularly to a metal-organic hybrid lattice material and the application in the detection of radiation sources.

DESCRIPTION OF THE RELATED ART

With the rapid development of nuclear energy and nuclear technology in China, radioisotopes and irradiation techniques have been widely used in industry, agriculture, medical treatment, science, geological survey, and other fields, bringing potential risks of ionizing radiation pollution. The development of an efficient, sensitive, and fast ionizing radiation detection technology is the key to the prevention and control of radiation pollution, and also an important prerequisite for guaranteeing human health and sustainable development of nuclear energy and nuclear technology. As an effective means for the prevention and control of radiation pollution, nuclear detection technology is useful for radiation safety monitoring in the fields of nuclear energy utilization, industrial automation, nuclear medical imaging, and environmental radioactive source monitoring.

At present, a variety of commercial materials for ionizing radiation detection have been developed. Radiation-induced photoluminescent materials, as luminescent signal outputting radiation detection material, have been widely used in the detection of X-ray, γ-ray, and others. However, this type of traditional radio-induced photoluminescent materials (glass, ceramics, high molecular polymers, and inorganic crystallization, etc.) still have the problems of low sensitivity, narrow detection range, poor linear relationship, complicated testing equipment and data processing, and others. Moreover, the stability and reuse rate of some materials also need to be improved. The traditional radio-induced photoluminescent detection materials have poor radiation shielding ability, which leads to poor radiation stability and low sensitivity, limiting the prospect of application of the materials; and the quantification of the radiation dose depends on the test and analysis by optical instruments, constituting a low-efficiency and cost-ineffective radiation detection method.

In the commercial radiation-induced discoloration indicator labels manufactured by integrating polyvinyl butyral (PVB) and ethanol-based dyes. However, this material can only be used as a disposable radiation test paper. Moreover, during the detection process, the color change of the indicator label before and after irradiation is visually observed by an inspector and compared with the chromaticity of a standard indicator label card for qualitative or semi-quantitative radiation detection analysis. The accuracy in the quantification of the radiation dose needs to be improved.

SUMMARY OF THE INVENTION

To solve the above technical problems, an object of the present invention is to provide a metal-organic hybrid lattice material and use thereof in the detection of radiation sources. The metal-organic hybrid lattice material of the present invention has radiation-induced color change and photoluminescence change and has good radiation stability. By taking advantage of the above-mentioned properties, the metal-organic hybrid lattice material of the present invention can be used to detect radiation sources and prepared into standard radiation-induced photoluminescence indicator labels.

The first object of the present invention is to provide a method for preparing a metal-organic hybrid lattice material, which includes the following steps:

Subjecting a water-soluble thorium salt and 2,2':6',2"-terpyridine-4'-carboxylic acid to a solvothermal reaction in a mixed solvent of water and an organic solvent at a reaction temperature of 80-120° C., to obtain a transparent bulk crystal comprising the metal-organic hybrid lattice material after complete reaction, where the mixed solvent also includes 1.6-2.5 wt % of an inorganic acid, and the molar ratio of the water-soluble thorium salt to 2,2':6',2"-terpyridine-4'-carboxylic acid is 1-2:1-2.

Preferably, the water-soluble thorium salt is thorium nitrate.

Preferably, in the solvothermal reaction system, the concentration of the water-soluble thorium salt is 0.025-0.5 mmol/mL.

Preferably, the volume ratio of water to the organic solvent is 1-3:1-3.

Preferably, the organic solvent is N,N'-dimethylformamide (DMF), and the volume ratio of water to DMF is 1-3:1-3.

Preferably, the solvothermal reaction time is 1-2 days.

In the present invention, 1.6-2.5 wt % of an inorganic acid means that the inorganic acid accounts for 1.6-2.5 wt % of the entire reaction solution.

In the preparation method, the inorganic acid serves to adjust the pH of the reaction, and the concentration refers to the mass fraction of the inorganic acid in the mixed solvent. Water serves to dissolve the thorium salt, and the organic solvent serves to dissolve 2,2':6',2"-terpyridine-4'-carboxylic acid.

A second object of the present invention is to provide a metal-organic hybrid lattice material prepared by the preparation method as described above, which has a chemical formula of $[Th_6O_4(OH)_4(H_2O)_6](H_{10}C_{16}N_3O_2)_8(COOH)_4$. The metal center of the metal-organic hybrid lattice material is tetravalent thorium, and the ligand is 2,2':6',2"-terpyridine-4'-carboxylic acid.

A third object of the present invention is to disclose the use of the metal-organic hybrid lattice material in the detection of radiation sources including ultraviolet(UV) rays and/or ionizing radiation beams.

Preferably, the wavelength of UV light is 400-10 nm, and the photon energy is 3.10-124 eV.

Preferably, the energy range of quantitative UV detection is 0-4.2 mJ. When the energy is higher than 4.2 mJ, the fluorescence signal intensity remains unchanged, and no quantitative detection is performed.

Preferably, ionizing radiation beams include one or more of X-rays, γ-rays, and β-rays.

Preferably, the qualitative detectable dose of X-rays is greater than 200 kGy, the detectable range for the dose of γ-rays is about 0-80 kGy, and the qualitative detectable dose of β-rays is greater than 200 kGy.

Due to the intrinsic photoluminescence of the ligand, the metal-organic hybrid lattice material of the present invention produces a fluorescence change under the irradiation of UV light and ionizing radiation beams. This characteristic is the characteristic of radiation-induced fluorescence change. Under different radiation conditions, the metal-organic hybrid lattice material will produce different color changes, which is the characteristic of radiation-induced color change. Using the above two characteristics, the material is useful in the detection of radiation sources to achieve the qualitative or quantitative analysis of radiation sources.

After the metal-organic hybrid lattice material of the present invention undergoes radiation-induced fluorescence change and radiation-induced color change, the signal intensity of the fluorescence characteristic peak before irradiation can be restored by heating so that the material can be recycled during the irradiation and detection process.

Preferably, after the irradiation, the material can be heated at 100-150° C. for 1-3 days to restore the signal intensity of the fluorescence characteristic peak. Since the organic ligand is excited by radiation to generate free radicals, the free radical signals generated after irradiation is analyzed by electron paramagnetic resonance (EPR) spectroscopy. Free electrons are transferred in the pyridine ring of the ligand and the $\pi$-$\pi$ interaction in the structure is enhanced, resulting in the fluorescence change of the material. The free radical signal disappears after heating, and the enhanced signal of luminescence characteristic peak returns to the initial value.

A fourth object of the present invention is to provide a method for detecting a radiation source. The radiation source includes ultraviolet rays and/or ionizing radiation beams. The method for detecting a radiation source includes a step of establishing a detection standard and a detection step.

The step of establishing a detection standard includes irradiating the metal-organic hybrid lattice material of the present invention with a radiation source of known wavelength or intensity and establishing the detection standard according to the color change or the change of the optical signal intensity of the metal-organic hybrid lattice material before and after irradiation.

The detection step includes irradiating the metal-organic hybrid lattice material of the present invention with a radiation source of unknown wavelength or intensity, comparing the color change or the change of the optical signal intensity of the metal-organic hybrid lattice material before and after irradiation with the detection standard, and qualitatively or quantitatively analyzing the radiation source of unknown wavelength or intensity.

Preferably, the wavelength of UV light is 400-10 nm, the photon energy is 3.10-124 eV, and the detectable energy range is about 0-4.2 mJ.

Preferably, ionizing radiation beams include one or more of X-rays, γ-rays, and β-rays.

Preferably, the step of establishing a detection standard includes the establishment of a qualitative detection standard or a quantitative detection standard.

The establishment of a qualitative detection standard includes the establishment of a visualized qualitative detection standard for radiation-induced color change or a visualized qualitative detection standard for photoluminescence change.

In the establishment of a visualized qualitative detection standard for the radiation-induced color change, the original metal-organic hybrid lattice material is irradiated with radiation sources of various known wavelengths or intensities, then the colors produced by the metal-organic hybrid lattice material are recorded, and a relationship between the various wavelengths or intensities of the radiation sources and the colors is established, which is used as the detection standard.

The means of recording may be imaging under a microscope with an image acquisition system.

In the establishment of a visualized qualitative detection standard for photoluminescence change, the original metal-organic hybrid lattice material is irradiated with radiation sources of various known wavelengths or intensities, then images of the lattice material before and after irradiation are acquired by an image acquisition system, and a relationship between the various radiation sources and the fluorescence characteristic peaks and signal intensities is established by a fluorescence spectrometer, which is used as the detection standard. In the establishment of a quantitative detection standard, the original metal-organic hybrid lattice material is irradiated with radiation sources of various known wavelengths or intensities, then the fluorescence signal intensity of the lattice material before and after irradiation is acquired, and the color rendering index is linearly fitted to the wavelengths or intensities of the radiation sources, to establish a linear calibration curve between the wavelength or dose of the radiation source and the color rendering index. The fluorescence signal intensity of the lattice material before and after irradiation can be acquired by an image acquisition system, and then the fluorescent color in the image is extracted by image processing software such as PhotoShop.

The detection step includes qualitative detection or quantitative detection.

Qualitative detection includes visualized qualitative detection of radiation-induced color change or visualized qualitative detection of photoluminescence change.

In the visualized qualitative detection of radiation-induced color change, the original metal-organic hybrid lattice material is irradiated with a radiation source of unknown wavelength or intensity (i.e., the radiation source to be tested), and the color produced is compared with the visualized qualitative detection standard for the radiation-induced color change to find out the known wavelength or intensity corresponding to the same color change, to determine the type of the radiation source to be tested.

In the visualized qualitative detection of photoluminescence change, the original metal-organic hybrid lattice material is irradiated with a radiation source of unknown wavelength or intensity (i.e., the radiation source to be tested), then the fluorescence characteristic peak and signal intensity of the lattice material before and after irradiation are acquired by an image acquisition system and compared with the visualized qualitative detection standard for photoluminescence change to find out the type of radiation source corresponding to the same fluorescence characteristic peak and signal intensity, to determine the type of the radiation source to be tested.

In the quantitative detection, the original metal-organic hybrid lattice material is irradiated with a radiation source of unknown wavelength or intensity (i.e., the radiation source to be tested), then the fluorescence signal intensity of the irradiated lattice material is collected, and the wavelength or dose corresponding to the color rendering index of the fluorescence signal intensity is found out in the linear calibration curve, to determine the precise wavelength or intensity of the radiation source to be tested.

Preferably, in the qualitative detection, the detectable dose of X-rays is greater than 200 kGy, the detectable dose of γ-rays is greater than 200 kGy, and the detectable dose of β-rays is greater than 200 kGy.

Preferably in quantitative detection, the detectable range for the dose of gamma rays is about 0-80 kGy.

Preferably, the collection of signal change after UV light also includes collecting the signal from the metal-organic hybrid lattice material under a xenon lamp by a solid-state spectrometer.

A fifth object of the present invention is to provide the use of the metal-organic hybrid lattice material in the preparation of a photoluminescence change indicator label. The photoluminescence change indicator label includes at least one transparent quartz container and the metal-organic hybrid lattice material sealed in the quartz container.

Preferably, the transparent bulk crystal prepared above in the present invention is ground into a powder, and packaged in a quartz container to prepare a photoluminescence change indicator label, that is, a radiation detection device. Since after the photoluminescence change and photo-induced color change, the signal intensity of the fluorescence characteristic peak before irradiation of the metal-organic hybrid lattice material can be restored by heating, the photoluminescence change indicator label can be repeatedly used.

A sixth object of the present invention is to provide a photoluminescence change indicator label, which includes at least one transparent quartz container and the metal-organic hybrid lattice material sealed in the quartz container.

Under irradiation with high-dose X-, γ-, and β-rays at 200 kGy, the color of the crystal in the photoluminescence change indicator label changes from pink-white to yellow-brown, by which visualized qualitative radiation detection of large-dose rays can be performed. Moreover, color change also occurs under irradiation with high-frequency UV light, by which visualized qualitative detection of UV light can be performed.

Furthermore, when the crystal in the photoluminescence change indicator label receives different doses of radiation, the change in the photoluminescence spectrum and the fluorescent color in the image will also have a regular trend with varying doses and can be collected and analyzed by different optical equipment and camera systems.

In the present invention, 2,2':6',2"-terpyridine-4'-carboxylic acid is used as a ligand that coordinates and crystallizes with the tetravalent thorium element under solvothermal conditions. The crystal material produces photo-induced color change and photoluminescence change upon irradiation with high-frequency UV light, X-rays, γ-rays, β-rays, and others. The material is useful for qualitative and quantitative detection and calibration after high-dose radiation. Compared with the traditional radiation-induced color change indicator labels, the material achieves the visual qualitative and quantitative detection and has strong radiation stability, high utilization rate, wide detection range, and good linear relationship, to solve the problem of traditional materials relying on professional optical equipment to quantify the radiation dose.

With the above solution, the present invention has the following advantages.

(1) In the present invention, the actinide metal thorium and an organic photoluminescence ligand are introduced to construct a metal-organic hybrid lattice material which is used as a new radiation-induced photoluminescence detection material. Compared with traditional hybrid materials, inorganic materials, and polymer materials, etc., the material of the present invention has a wider detection range and better linear relationship.

(2) The metal-organic hybrid lattice material of the present invention has strong radiation stability and a high utilization rate.

(3) The metal-organic hybrid lattice material of the present invention can not only achieve the visualized qualitative detection of rays by taking advantage of the radiation-induced color change but also achieve the visualized quantitative detection of rays by taking advantage of the radiation-induced photoluminescence change.

(4) In the present invention, the original crystal material is designed as a packaged component, which is convenient for the test and use in a radiation field, and can be recycled after heating, ensuring the stability of the material, and avoiding the influence by external environmental damage such as wind erosion.

(5) The radiation-induced photoluminescence quantitative indicator label provided in the present invention is a new visual radiation-induced color change indicator label designed based on commercial radiation-induced color change indicator labels, and also a new means of calibrating the radiation dose. It has a wide detection range for radiation dose and achieves the accurate detection of radiation dose by utilizing the change of fluorescence signal, to solve the problem of traditional materials that rely on professional optical equipment for quantification of radiation dose.

The above description is only a summary of the technical solutions of the present invention. To make the technical means of the present invention clearer and implementable following the disclosure of the specification, the preferred embodiments of the present invention will be described in detail with reference to the accompanying drawings.

DETAILED DESCRIPTION OF THE PREFERRED EMBODIMENTS

The specific embodiments of the present invention will be described in further detail with reference to embodiments. The following embodiments are intended to illustrate the present invention, instead of limiting the scope of the present invention.

Example 1. Material Synthesis and Test of Structural Stability Before and After Irradiation In this example, the material was synthesized and the stability of the crystal structure was tested under various irradiation conditions to verify that the material of the present invention can be practically used in various large-dose irradiation conditions without radiation damage to the material.

Figure 1:
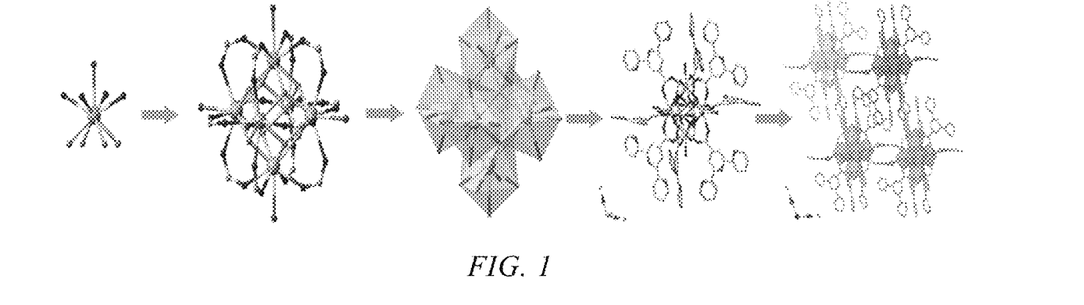
FIG. 1 is a schematic diagram showing the structure of a crystal material prepared in Example 1 of the present invention.

0.05 mmol of solid $Th(NO_3)_4 \cdot 6H_2O$, 0.05 mmol of solid 2,2':6',2"-terpyridine-4'-carboxylic acid, and 1.6-2.5 wt % hydrochloric acid, 1 mL of $H_2O$, and 1 mL of DMF were added to a 5 ml glass vial, sealed, heated to 100° C., and reacted for 1-2 days under heating. After the reaction, a transparent bulk crystal product was obtained. The crystal product was taken out of the vial and washed with ethanol, and then air dried at room temperature, to obtain a metal-organic hybrid lattice material, which was hereinafter referred to as crystal material. The reaction route is as follows:

FIG. 1 is a schematic diagram showing the structure of the crystal material. The crystal is composed of 0-dimensional cluster structures. The tetravalent thorium ions form a hexa-nuclear thorium cluster center $[Th_6(OH)_4(O)_4(H_2O)_6]^{12+}$ through hydrolysis and polymerization, in which the thorium ions are linked by $O^{2-}$ and $OH^-$. The hexanuclear thorium cluster center is further modified and attached with eight 2,2':6',2"-terpyridine-4'-carboxylic acid ligands and four carboxylic acid anions. The 0-dimensional clusters are periodically alternately arranged such that a strong π-π interaction is formed between pyridine rings.

Figure 2:
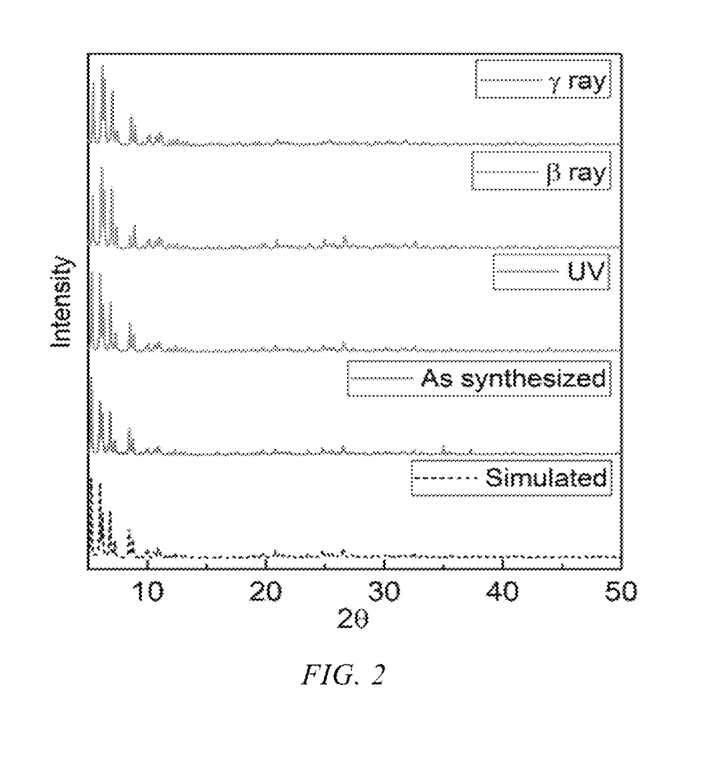
FIG. 2 is a powder diffraction pattern of the crystal material tested before and after irradiation in Example 1 of the present invention.

After the crystal material was obtained following the above method, the material was respectively irradiated with exciting UV light at 254 nm for more than 2 h, γ-ray from a $Co^{60}$ radiation source at a dose of 200 kGy, or β-ray generated by an electron accelerator at a dose of 200 kGy. The crystal before and after irradiation was characterized by a powder diffractometer, as shown in FIG. 2. In FIG. 2, the Simulated curve is a pattern of the structure of the $[Th_6O_4(OH)_4(H_2O)_6](H_{10}C_{16}N_3O_2)_8(HCOO)_4$ crystal powder simulated by software, the As synthesized curve represents the powder diffraction pattern of the crystal material before irradiation, UV, γ-ray, and β-ray represents the powder diffraction patterns obtained after the crystal material is irradiated by the corresponding rays. In the figure, their main characteristic peak profiles are the same, which objectively shows that the purity of the synthesized crystal is very high and the crystal morphology is kept unchanged after irradiation. Therefore, the crystal material is useful in the research of radiation detection materials.

Example 2. Thermogravimetric Analysis of Crystal Material

In this example, the synthesized crystal material was tested for thermal stability to verify the heat resistance of the material of the present invention. Therefore, the fluorescence signal value could be restored by heating at an appropriate temperature, to enable the material to be recycled.

Figure 3:
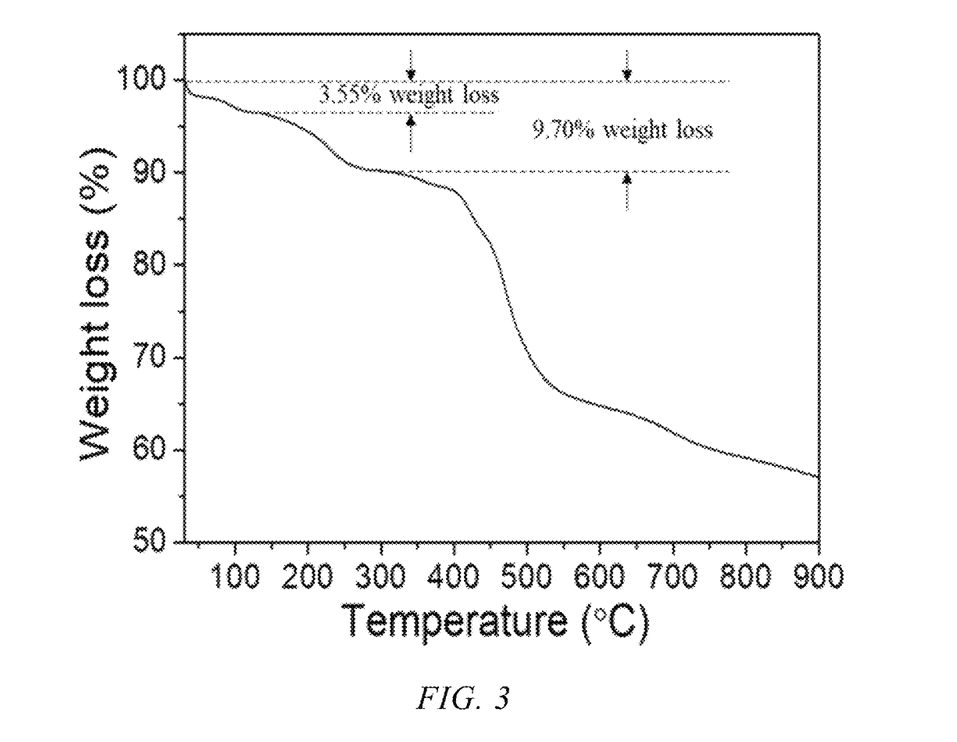
FIG. 3 is a thermogravimetric analysis (TGA) curve of the crystal material tested in Example 2 of the present invention.

The crystal produced in Example 1 was characterized by a thermogravimetric analyzer. As shown in FIG. 3, the result shows that the skeleton of the crystal material does not collapse before 150° C., ensuring the stability of the structure; and only the water and DMF molecules in the structure of the crystal material are lost before 150° C. (3.55% weight loss). The weight loss of 9.70% before 300° C. is attributed to the free water, DMF, coordinated water molecules, and carboxylic acid in the structure. Therefore, it is possible to find a suitable temperature before 150° C. to restore the fluorescence signal intensity of the crystal material without causing the structure to be destroyed.

Example 3. Fluorescence Stability after Irradiation

In this example, the crystal material was irradiated under UV to verify that the fluorescence signal of the material of the present invention after irradiation can be stable for a long time at room temperature. The quantitative detection limit of UV light is 4.21 mJ, when it exceeds 4.21 mJ, the fluorescence will reach saturation and the fluorescence signal will not change. Therefore, the energy that exceeds the quantitative detection limit is used for the stability test.

The crystal material prepared in Example 1 was irradiated under UV at 254 nm (5.26 mJ) for 2 h or more, stored in a dark chamber, and tested for luminescence stability at different time within two days.

Figure 4:
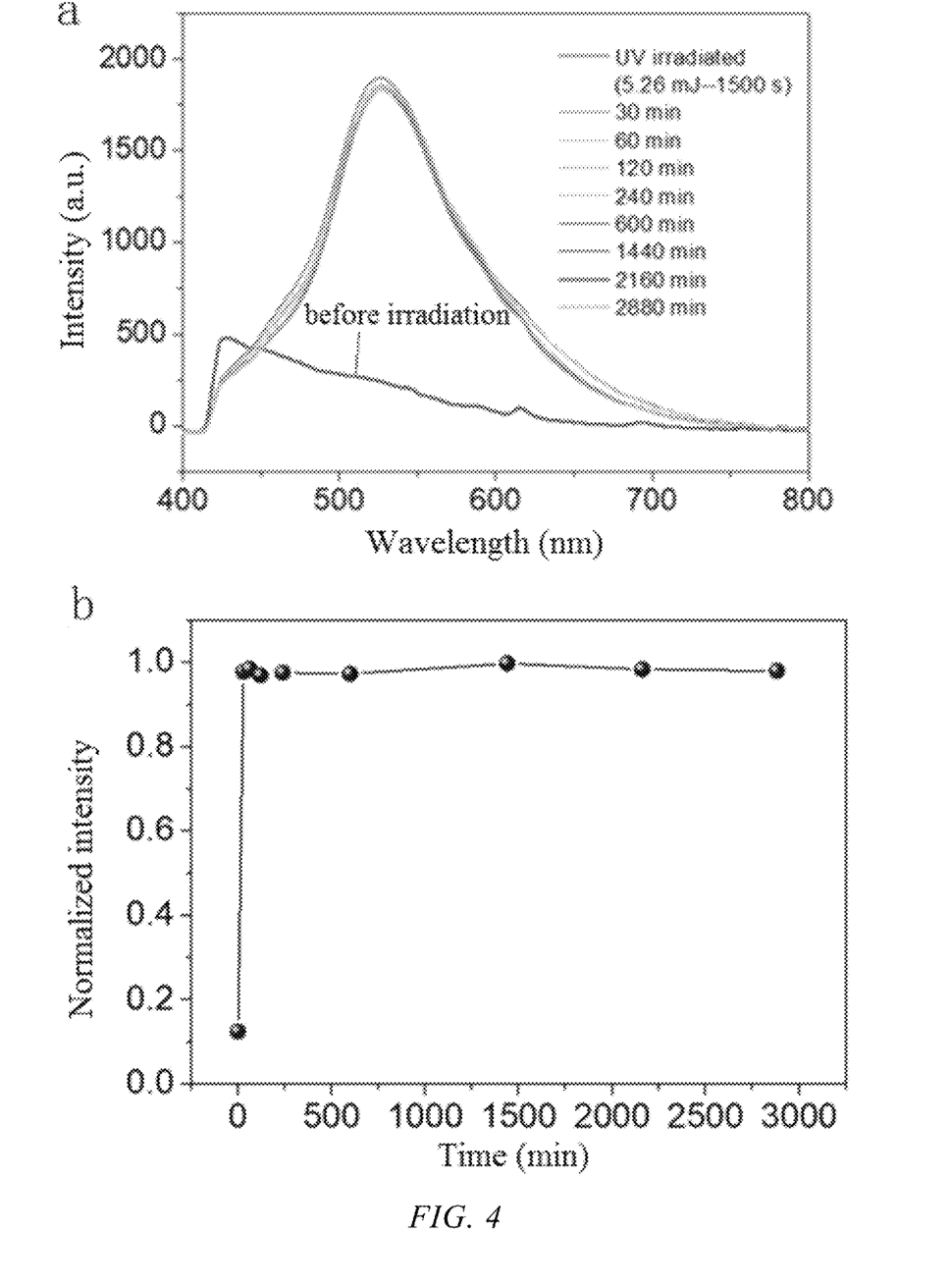
FIG. 4 shows the results of the photoluminescence stability test of the crystal material tested after irradiation in Example 3 of the present invention.

The fluorescence signal of the crystal was characterized by a solid-state spectrometer (FIG. 4). FIGS. 4a and b respectively show the test results of the fluorescence signal intensity of the crystal material under UV light at different times and the relationship between the fluorescence signal intensity and the irradiation time. FIG. 4 shows that the fluorescence signal of the crystal material changes after UV irradiation, resulting in radiation-induced photoluminescence change, and the fluorescence signal has no obvious change within two days (except for the pre-irradiation curve, other curves are basically overlapped in FIG. 4a), suggesting that the fluorescence stability of the material after irradiation is very good, and will not deteriorate or change over time.

Example 4. Design of Packaged Radiation Detection Device and Test of Reuse Rate

In this example, the material in a packaged device was irradiated and then heated to restore the fluorescence signal. The operations were repeated several times to verify the practicability and reuse rate of the material of the present invention.

The crystal material prepared in Example 1 was ground into a powder, compacted, and fed to a notch of a single-side notched quartz sheet (where the single-side notched quartz sheet has a size of 2.5 cm×2.5 cm and a thickness of 0.2 cm, a notch is provided at the center of the single-side notched quartz sheet, and the notch has a size of 0.5 cm×0.5 cm, and a depth of 0.1 cm), the notch was sealed with a quartz sheet has a thickness of 0.1 cm, and the four sides of the quartz sheet were fixed and sealed to prepare a radiation detection device.

Figure 5:
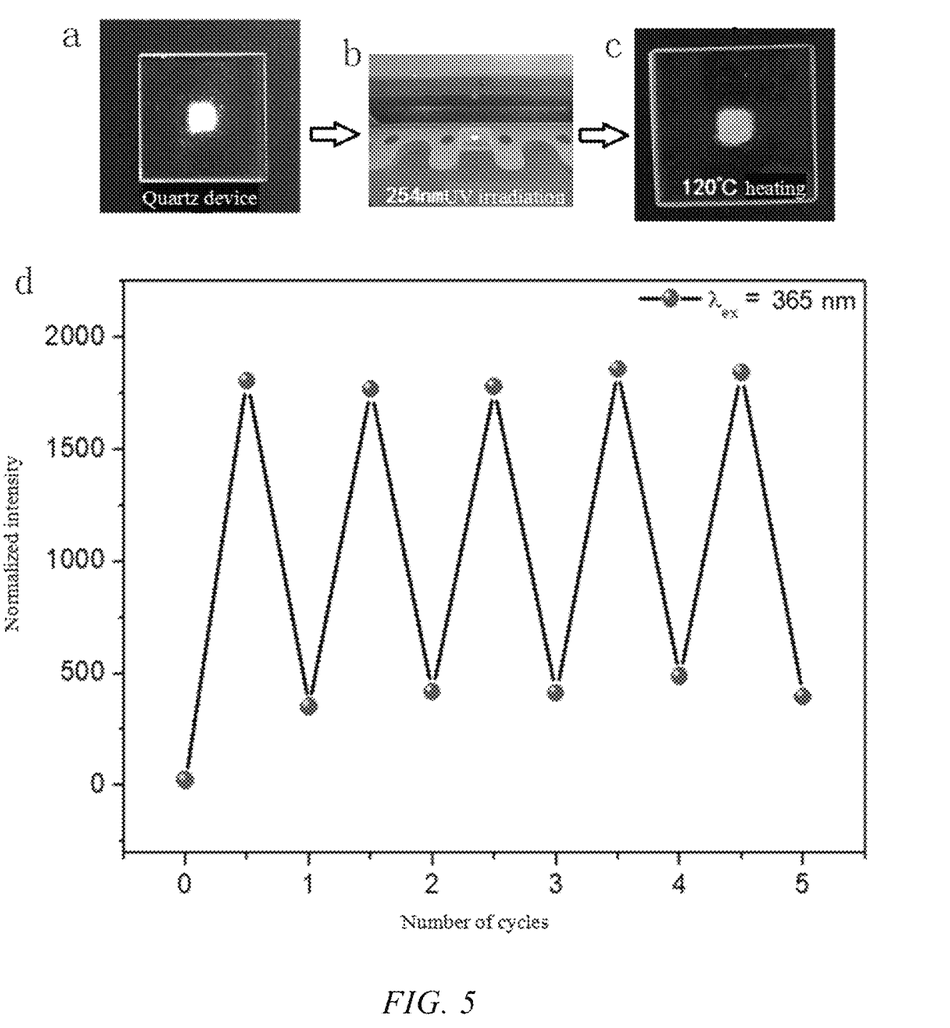
FIG. 5 shows the radiation detection device designed and the cyclic radiation-induced fluorescence in Example 4 of the present invention.

The fluorescence signal intensity of the crystal material before irradiation was tested. The radiation detection device was irradiated under UV at 254 nm for more than 2 h, and then the fluorescence signal intensity of the crystal material in the radiation detection device was tested. After the test, the radiation detection device was heated at 120° C. for 1 day, and then the fluorescence signal intensity of the crystal material in the radiation detection device was tested. These operations were one cycle, and five cycles of operations were performed. A schematic diagram of one of the cycles is shown in FIGS. 5a-c.

The photoluminescence signal intensity of the material was characterized by a solid-state spectrometer (FIG. 5d). With the same instrument parameters, a fluorescence spectrum of the crystal material was obtained. The signal intensities of the fluorescence emission peaks at 532 nm were compared. By using the results of the five rounds of tests, the intensities were fitted and plotted. The result is shown in FIG. 5d. The result shows that the fluorescence intensity of the crystal material prepared in the present invention is restored after heating, proving that the material can be cyclically used in the detection of high-dose radiation.

Figure 6:
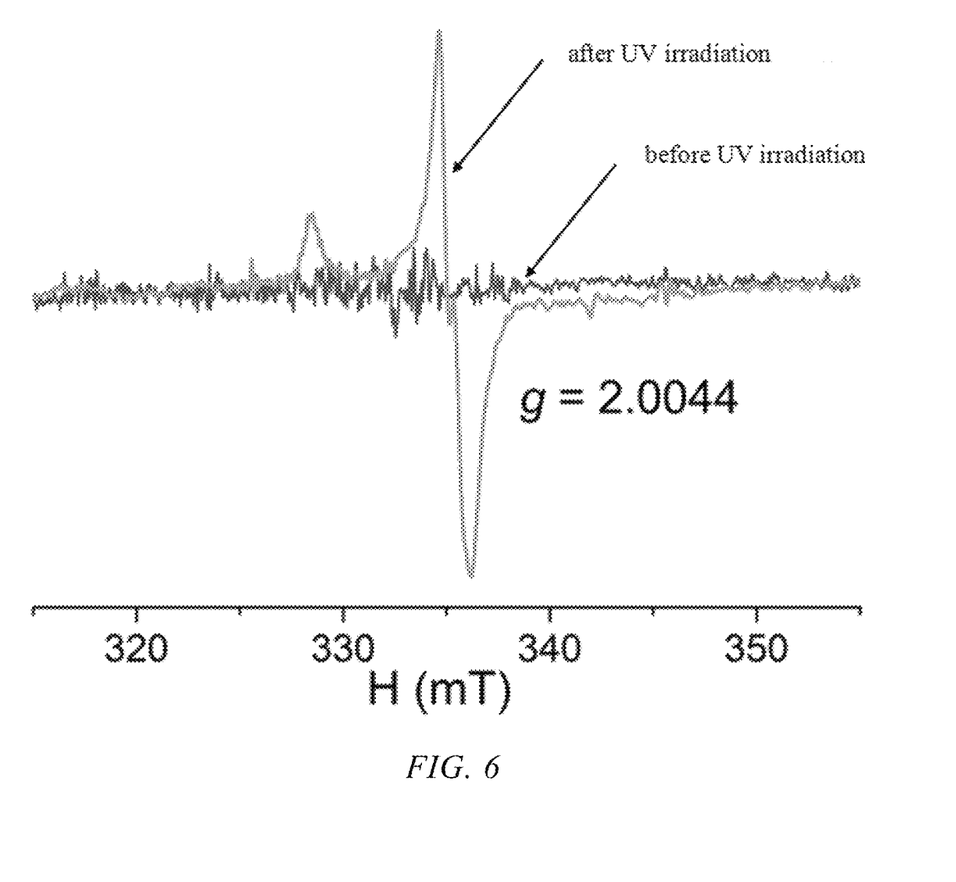
FIG. 6 shows the free radical signals from the crystal tested before and after irradiation with UV light in Example 4 of the present invention.

FIG. 6 shows the difference of the free radical signals before and after the crystal material is irradiated with UV at 254 nm, indicating that the irradiation causes the production of a free radical signal by the ligand, and the presence of the free radical signal changes the characteristic peak of the fluorescence signal, resulting in radiation-induced color change and radiation-induced photoluminescence change.

Example 5. Visualized Qualitative Detection of Radiation-Induced Color Change

In this example, individual crystal materials were irradiated with various rays. The color change of the crystal before and after irradiation was compared by naked eyes to verify that the radiation-induced color change of the material of the present invention is useful for the visualized qualitative detection of rays.

Figure 7:
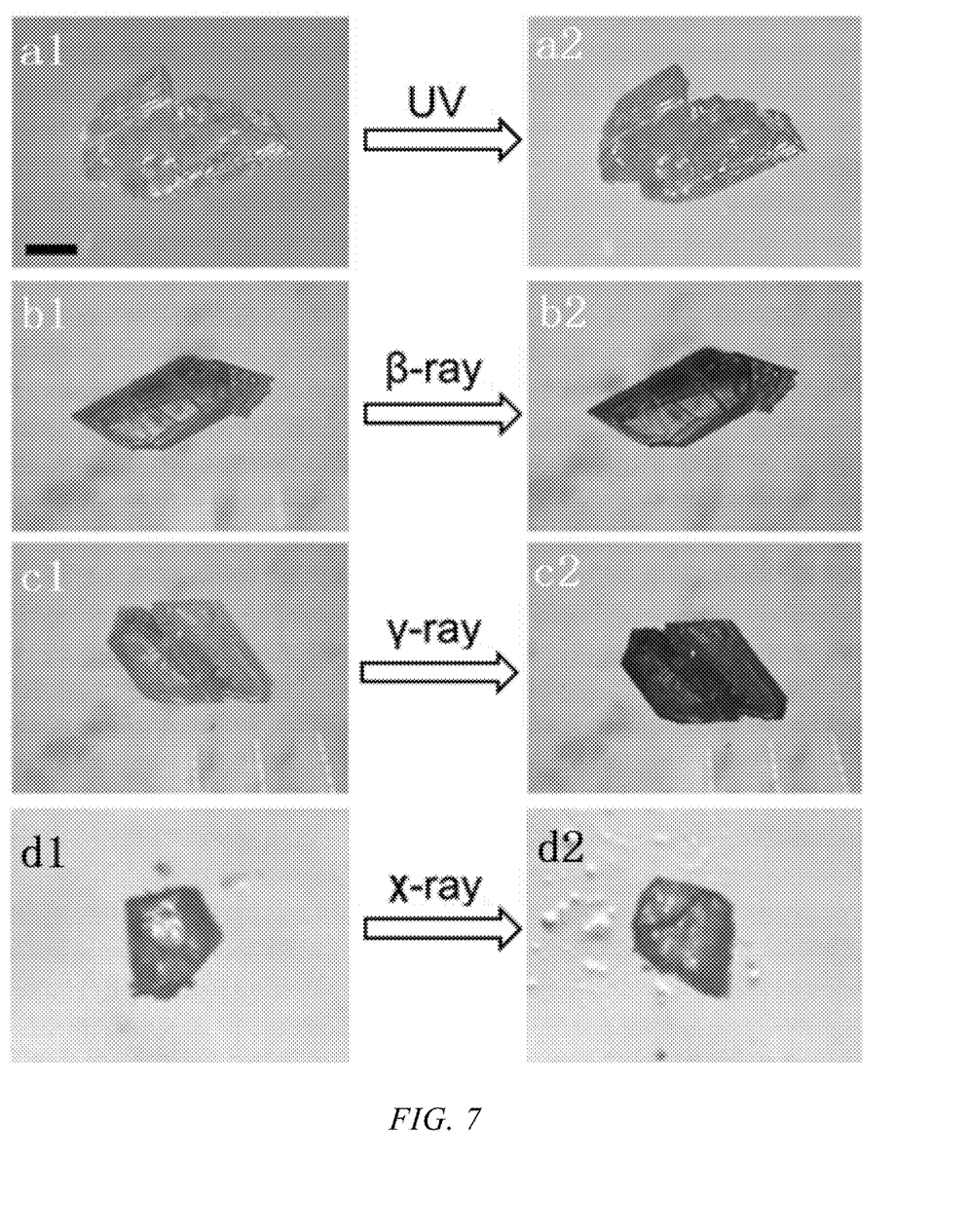
FIG. 7 shows the color change of the crystal under irradiation by various radiation sources in Example 5 of the present invention.

Four original crystal samples were imaged under a microscopic imaging system, and then irradiated with UV at 254 nm for 2 h, and γ-, β-, and X-ray at a dose of 200 kGy, 200 kGy, and 200 kGy respectively. Next, each of the crystal samples was imaged under the microscopic imaging system. The results are shown in FIG. 7. FIG. 7 shows that the crystal changes from white-pink to yellow after UV light and X-ray irradiation, and the crystal changes from pink to yellow-brown after γ- and β-ray irradiation.

Example 6. Visualized Qualitative Detection of Photoluminescence Change

In this example, individual crystal materials were irradiated with various rays. The photoluminescence change of the crystal before and after irradiation was compared to verify that the radiation-induced photoluminescence change of the material of the present invention is useful for the visualized qualitative detection of rays.

Figure 8:
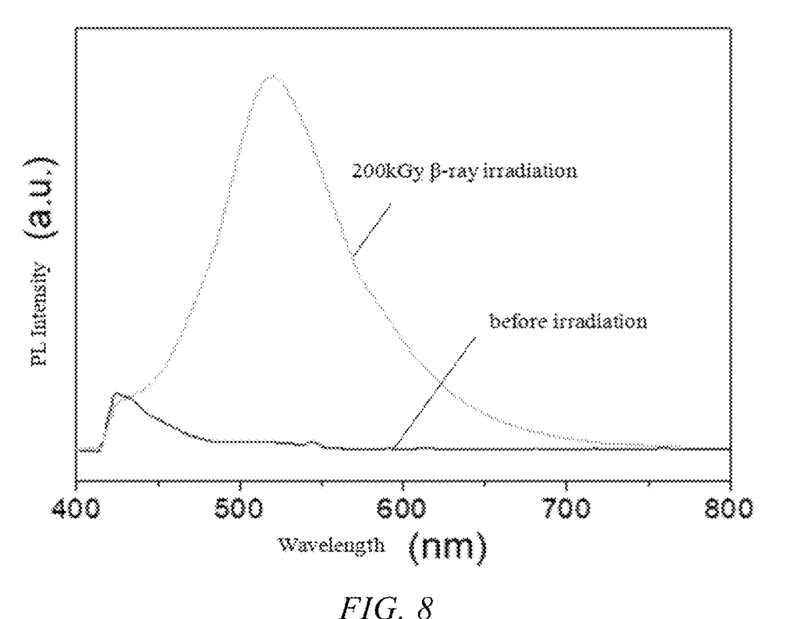
FIG. 8 shows the photoluminescence of the crystal tested before and after irradiation with β-ray at 200 kGy in Example 6 of the present invention.
Figure 9:
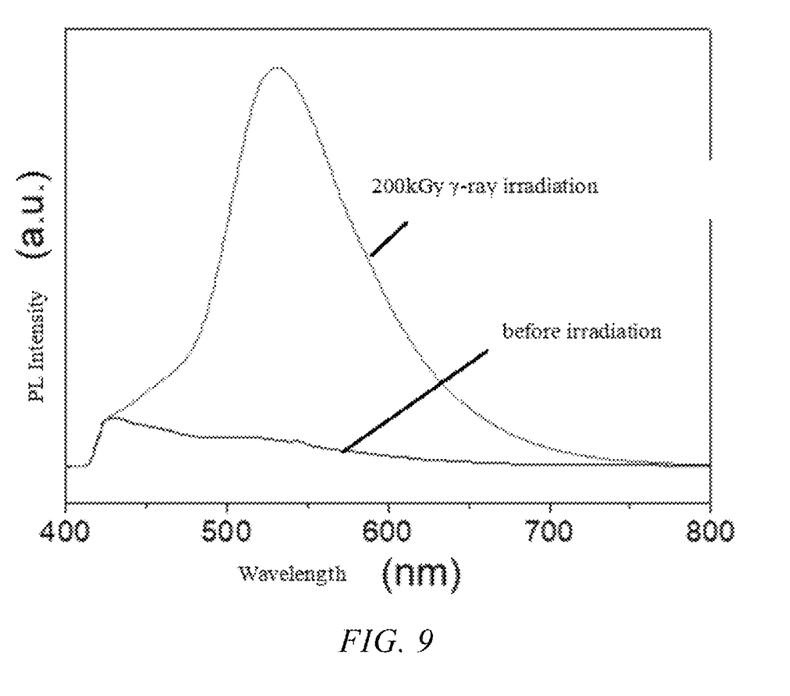
FIG. 9 shows the photoluminescence of the crystal tested before and after irradiation with γ-ray at 200 kGy in Example 6 of the present invention.
Figure 10:
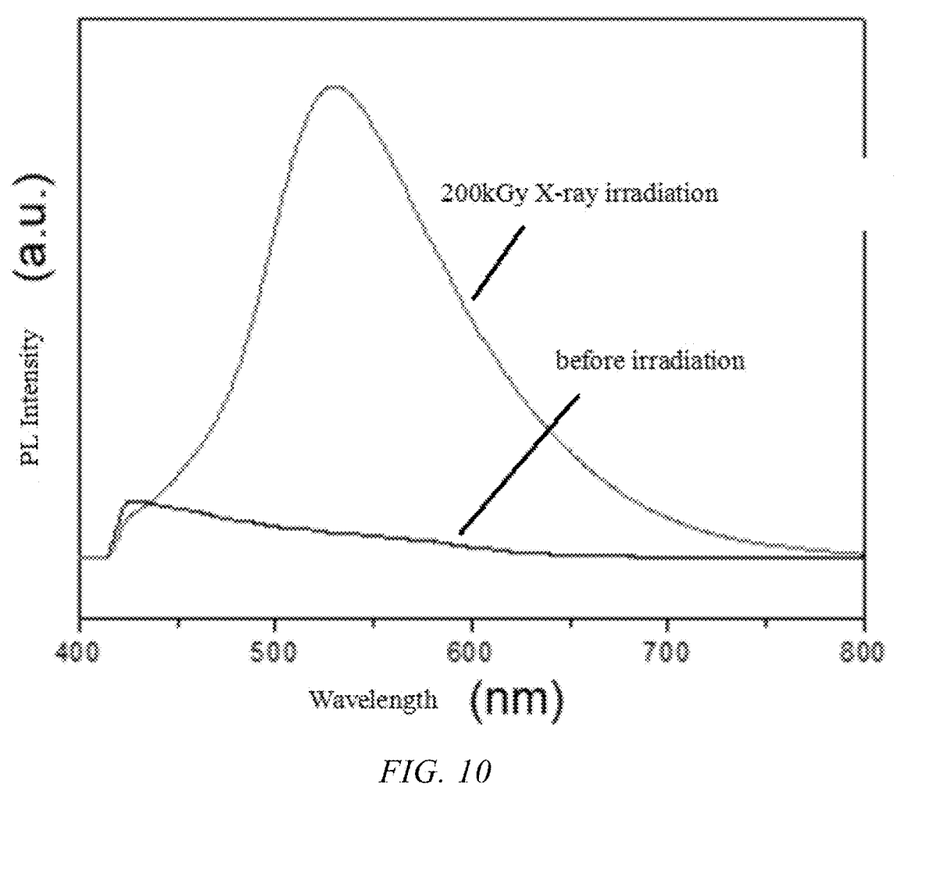
FIG. 10 shows the photoluminescence of the crystal tested before and after irradiation with X-ray at 200 kGy in Example 6 of the present invention.

The photoluminescence spectra of four original crystal samples were obtained and then the samples were irradiated with γ-, β-, and X-rays at a dose of 200 kGy, 200 kGy, and 200 kGy respectively. Then the photoluminescence spectrum of each crystal after irradiation was obtained. A merged photoluminescence spectrum was drawn, and the fluorescence change was read from the merged spectrum. The photoluminescence signal spectrum was tested by a solid-state spectrometer (FIG. 8-10), where the UV excitation wavelength is 365 nm. FIGS. 8-10 shows that the emission peak of the crystal is at 432 nm before β-, γ-, and X-ray irradiation, and the peak position of the emission peak changes from 432 to 532 nm after irradiation, indicating that the crystal material has visible fluorescence changes after irradiation.

In addition to drawing a merged photoluminescence spectrum and reading the fluorescence change from the merged spectrum, the crystal material can also be excited by a handheld fluorescent lamp and then the change in fluorescent color of the material is visually observed.

Example 7. Design of γ-Ray Radiation-Induced Photoluminescence Quantitative Indicator Label In this example, the crystal sample was irradiated with γ-ray, and a radiation-induced photoluminescence quantitative indicator label was simulated by a radiation detection device designed in the present invention, to verify the method visually quantifying the radiation dose and effect thereof in the present invention.

Figure 11:
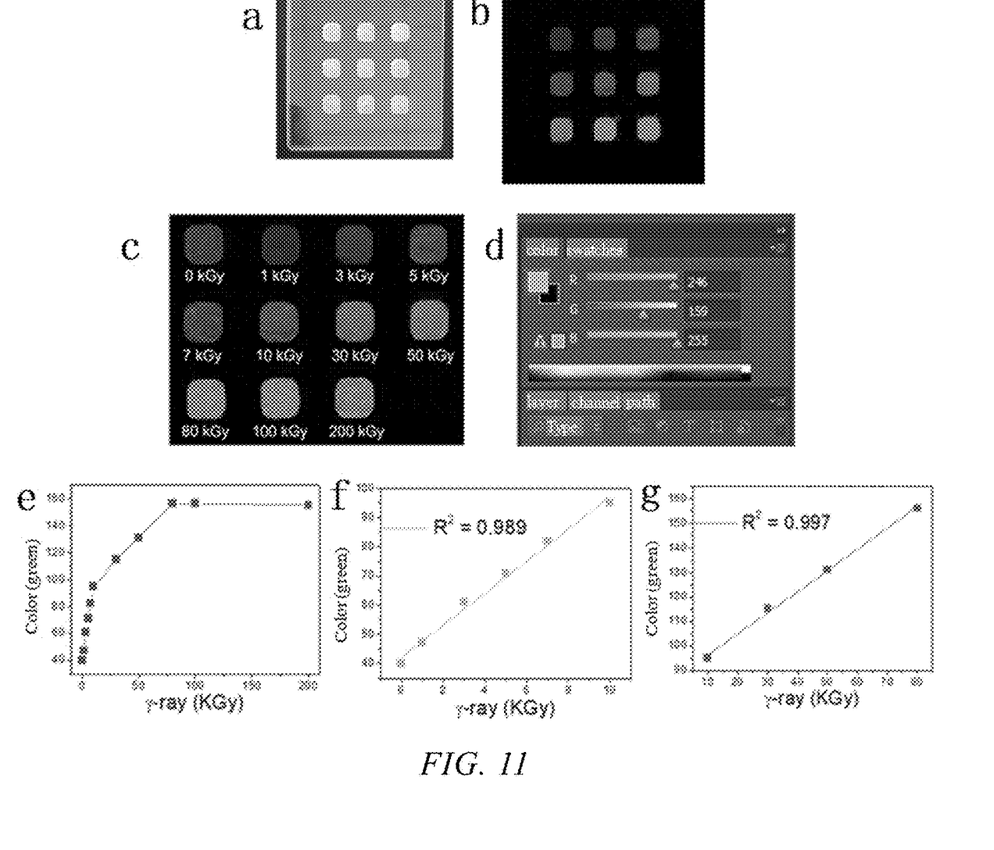
FIG. 11 shows the radiation-induced photoluminescence indicator label after irradiation with various doses of γ-ray and quantification of the dose by linear fitting in Example 7 of the present invention.

According to the method in Example 4, the crystal material prepared in Example 1 was respectively packaged in a single-side notched quartz sheet provided with multiple notches, such as 3×3 notches, to complete the preparation of a radiation-induced photoluminescence quantitative indicator label (FIG. 11a). The photoluminescence images at various doses of γ-rays are shown in FIG. 11b.

In addition, a quartz sheet with more notches can be designed, to design a standard radiation detection device. The packaged standard radiation detection device was tested by irradiating the samples with γ-rays from a $Co^{60}$ radiation source at a dose of 1 kGy, 3 kGy, 5 kGy, 7 kGy, 10 kGy, 30 kGy, 50 kGy, 80 kGy, 100 kGy, and 200 kGy respectively. The samples in the irradiated devices were excited in the ZF-II UV analyzer under UV light at 365 nm, and a photoluminescence image of the samples after irradiation was taken by ordinary photographic equipment in a dark chamber, that is, a standard radiation-induced photoluminescence indicator label. The fluorescent color of an irradiated material was visually observed with naked eyes and compared with the radiation-induced photoluminescence indicator label photographed in the experiment, to semi-quantitatively determine the radiation dose received by the material (FIG. 11c).

The color was extracted from the photographed radiation-induced photoluminescence indicator label and analyzed by the color extraction function in photoshop and other image processing software (FIG. 11D). The color rendering index of the fluorescent color in the image was read, and the color rendering index of green in the three primary colors was linearly fitted to the radiation dose, to obtain the linear relationship between the dose and the color rendering index (FIG. 11e). After that, a sample irradiated at an unknown dose was imaged under the same imaging conditions, and the color in the image was extracted by the same software. The green rendering index was read, and interpolated in the fitted linear relationship, to quantitatively read the radiation dose of the material.

In the present invention, the detectable range of the radiation dose of γ-ray is 0-80 kGy. After irradiation at a dose above 80 kGy, the color rendering indexes of green, red, and blue in the three primary colors tend to be stable, so the radiation dose cannot be read from the standard radiation-induced photoluminescence indicator label by comparing the colors. FIG. 11 shows that a linear relationship between the dose and the green rendering index is fitted in the dose range of 0-10 kGy (FIG. 11f), and another linear relationship between the dose and the green rendering index is fitted in the dose range of 10-80 kGy (FIG. 11G). Therefore, by using the fluorescent color of the irradiated material of the present invention in combination with the two linear relationships, the radiation dose of γ-rays in the range of 0-80 kGy can be accurately quantified.

Example 8. Use of X-Ray Radiation-Induced Photoluminescence Quantitative Indicator Label In this example, the sample material was irradiated with a beam of X-rays, and the position of the beam of X-rays was determined by obvious photoluminescence change and the color change of the material to verify the ability and effect of the present invention in the qualitative detection of high-dose X-rays.

Figure 12:
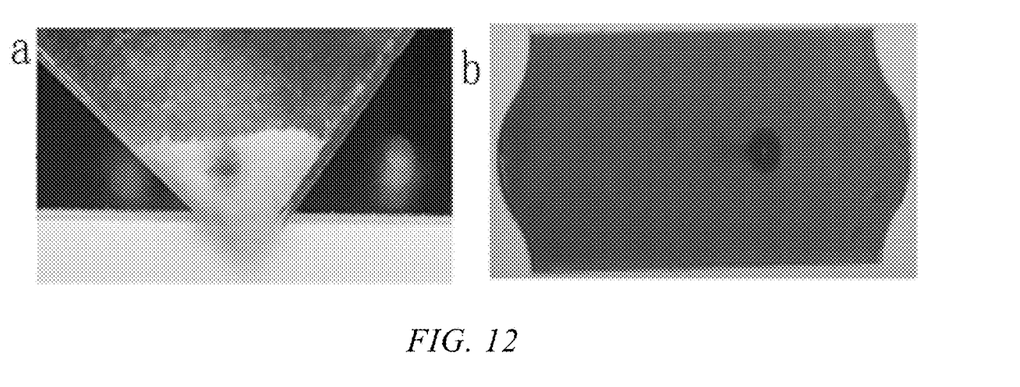
FIG. 12 is a schematic diagram showing the radiation detection in an X-ray radiation field of BL14W1 beamline of Shanghai Synchrotron Radiation Facility in Example 8 of the present invention.

The crystal material was positioned in the center of a sample platform in an ionization chamber of BL14W1 beamline of Shanghai Synchrotron Radiation Facility, the line path of the light source was adjusted, and the crystal material was irradiated by X-rays. The color of the crystal material appeared yellow at the irradiated position (FIG. 12a). The irradiated area was irradiated with UV light of 365 nm from a flashlight and emitted a green fluorescence signal, proving that the crystal in this area has radiation-induced photoluminescence change. The crystal material of the present invention is used in a standard color change indicator label paper, and can be used to calibrate the emission position of the light source. Compared with the commercial radiation-induced color change indicator label paper (FIG. 12B) in the beamline of Shanghai Synchrotron Radiation Facility, the material of the present invention can be recycled, and has certain effects and practical application value.

Example 9. Study on UV-Induced Photoluminescence and Color Change

In this example, the crystal material was irradiated with UV light at 365 nm, to verify the color change and photoluminescence change of the material of the present invention.

Figure 13:
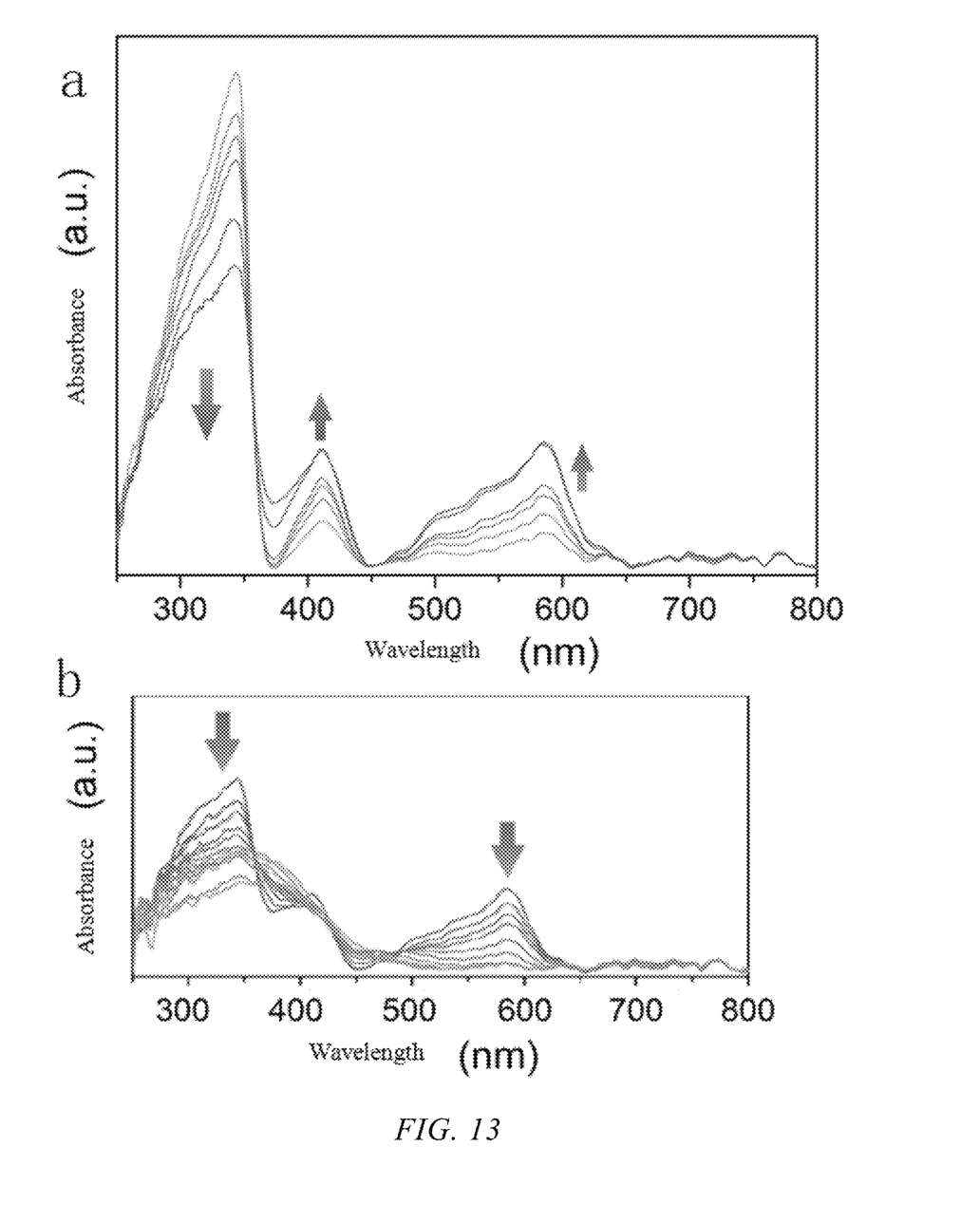
FIG. 13 shows the ultraviolet-visible absorption by the crystal tested after irradiation with various energy of UV light in Example 9 of the present invention.
Figure 14:
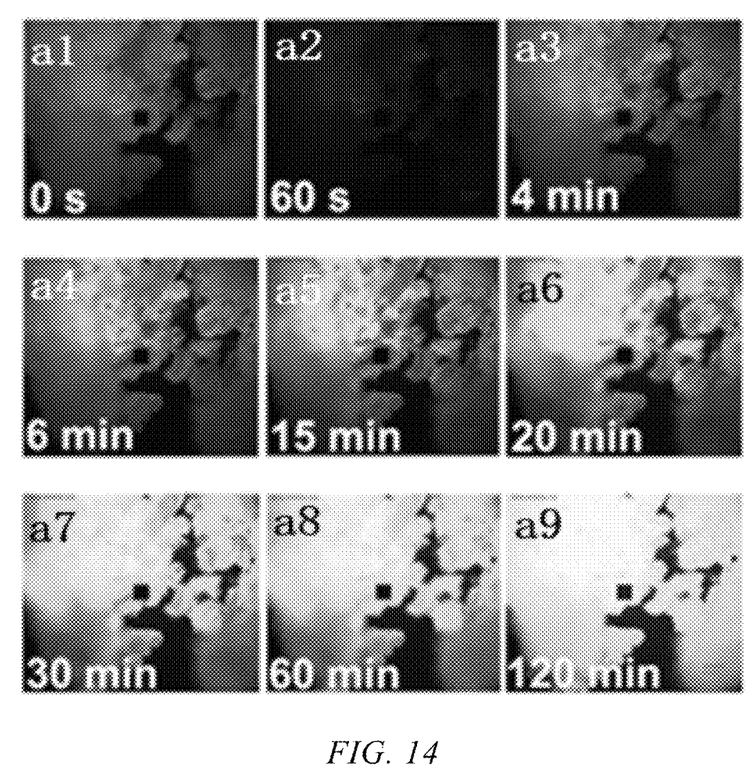
FIG. 14 shows photoluminescence images of the crystal tested after irradiation with various energy of UV in Example 9 of the present invention.
Figure 15:
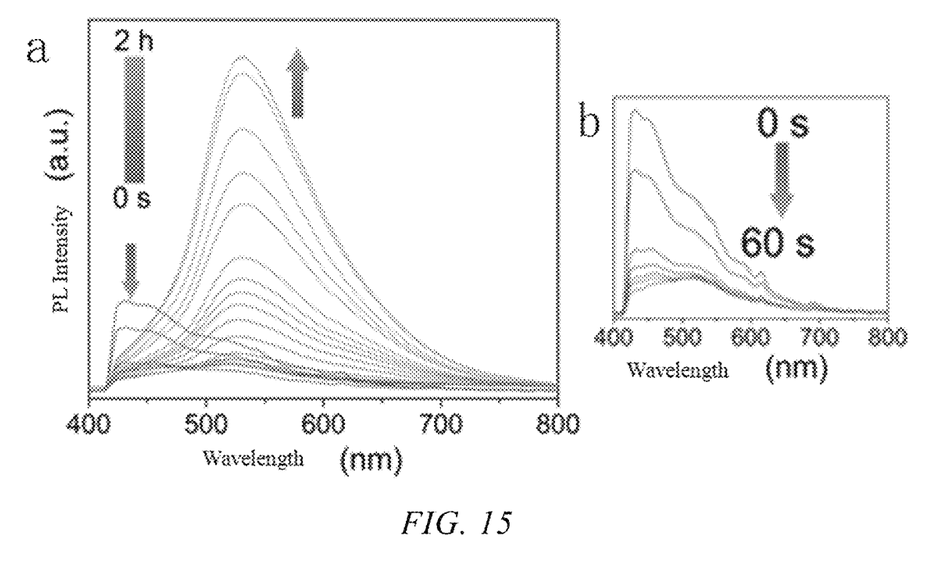
FIG. 15 shows the photoluminescence spectra tested after irradiation with various energy of UV in Example 9 of the present invention.
Figure 16:
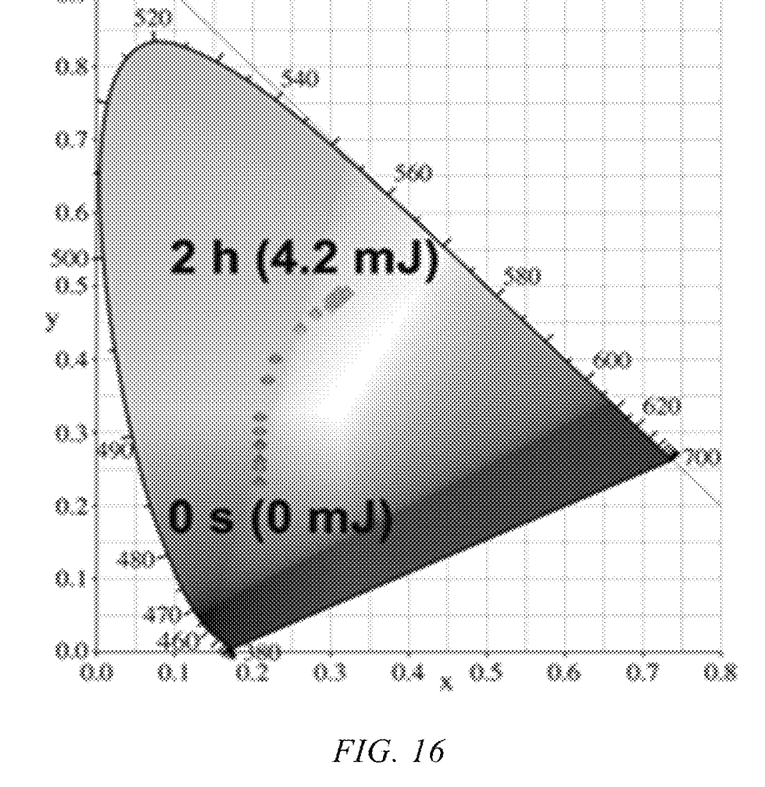
FIG. 16 is a CIE diagram tested after irradiation with various energy of UV in Example 9 of the present invention.
Figure 17:
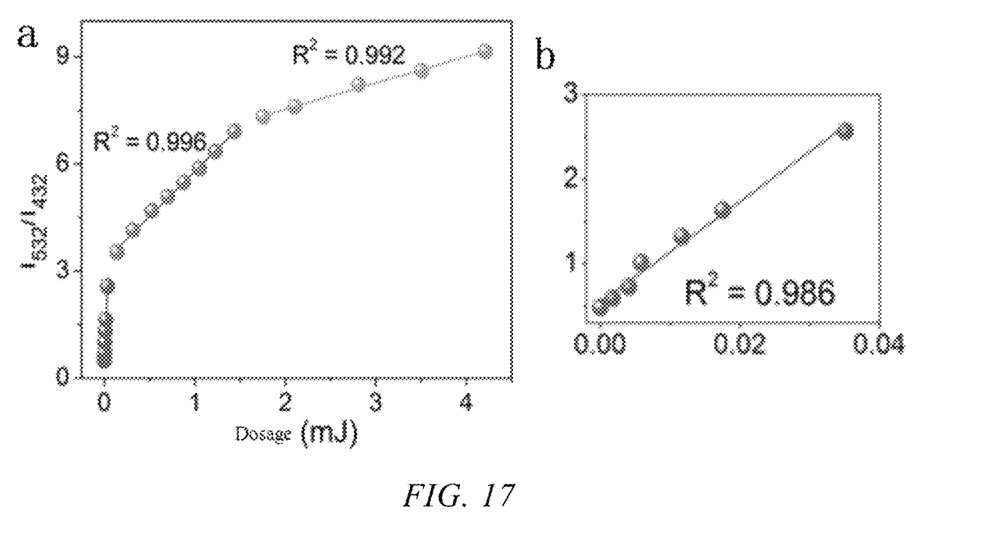
FIG. 17 shows the linear relationship between the dose and the intensity of the spectral characteristic peak tested after irradiation with various energy of UV in Example 9 of the present invention.

The crystal material was irradiated with UV light at 365 nm in a solid-state spectrometer, and the luminescence spectrum and ultraviolet-visible absorption spectrum signals were collected at various times within 0-2 h (FIG. 13). Images of fluorescence changes at various times were taken, and the trend of changes in CIE of the fluorescence spectrum was fitted by CIE1931 software. Also, the linear relationship between the energy of UV light and the intensity ratio ($I_{532}/I_{432}$) of spectral characteristic peaks was fitted. As shown in FIGS. 14-17, the detectable range of the dose when the material is irradiated with UV light at 365 nm is 0-4.2 mJ. In the ranges of 0-0.04 mJ, 0.04-1.5 mJ, and 1.5-4.2 mJ, there are three linear trends of changes. After 60 s (0.04 mJ) of irradiation, the characteristic fluorescence peak at 432 nm is almost quenched, and the blue fluorescence signal is the weakest. After 60 s, the characteristic fluorescence peak at 532 nm becomes strong, and the fluorescence gradually changes from blue to blue-green and then to green fluorescence. The trend in color change is shown in the CIE diagram in FIG. 16.

FIG. 13 shows the changes in UV-Vis absorption spectrum after different energy of UV light. FIGS. 13a and b show that under irradiation with UV light at 365 nm in a solid-state spectrometer, the intensity of the absorption peak at 340 nm in the UV-Vis absorption spectrum decreases continuously in 60 s, and the intensities of the absorption peaks at 410 nm and 580 nm increase continuously; in 60 s-2 h, the intensity of the absorption peak at 340 nm continues to decrease, and the intensity of the absorption peak at 580 nm starts to decrease continuously, showing two-stage regular trends of change. At the same time, the color of the crystal turns yellow gradually, indicating that the adsorption of the crystal in the visible region changes and more energy of UV light absorbed also leads to the continuous increase of the fluorescence intensity.

The above results show that the crystal material of the present invention also has a good effect on the detection of high-frequency UV light. The energy of UV light can be qualitatively analyzed utilizing the radiation-induced color change, or quantitatively analyzed by the intensity of the luminescence signal.

While preferred embodiments of the present invention have been described above, the present invention is not limited thereto. It should be appreciated that some improvements and variations can be made by those skilled in the art without departing from the technical principles of the present invention, which are also contemplated to be within the scope of the present invention.

What is claimed is:

1. A method for preparing a metal-organic hybrid lattice material, comprising the following steps:
    subjecting a water-soluble thorium salt and 2,2':6',2"-terpyridine-4'-carboxylic acid to a solvothermal reaction in a mixed solvent of water and an organic solvent at 80-120° C., to obtain a crystal comprising the metal-organic hybrid lattice material after complete reaction, wherein the mixed solvent also comprises 1.6-2.5 wt % of hydrochloric acid, and the molar ratio of the water-soluble thorium salt to 2,2':6',2"-terpyridine-4'-carboxylic acid is 1-2: 1-2.
2. The method according to claim 1, wherein the water-soluble thorium salt is thorium nitrate.

* * * * *